United States Patent
Kurakami (10) Patent No.: US 11,115,427 B2
(45) Date of Patent: Sep. 7, 2021

(54) MONITORING DEVICE, MONITORING METHOD, AND MONITORING PROGRAM

(71) Applicant: NIPPON TELEGRAPH AND TELEPHONE CORPORATION, Tokyo (JP)

(72) Inventor: Hiroshi Kurakami, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 192 days.

(21) Appl. No.: 16/499,871

(22) PCT Filed: Mar. 27, 2018

(86) PCT No.: PCT/JP2018/012566
§ 371 (c)(1),
(2) Date: Oct. 1, 2019

(87) PCT Pub. No.: WO2018/186242
PCT Pub. Date: Oct. 11, 2018

(65) Prior Publication Data
US 2020/0028866 A1    Jan. 23, 2020

(30) Foreign Application Priority Data
Apr. 4, 2017 (JP) .............................. JP2017-074559

(51) Int. Cl.
*H04L 29/06* (2006.01)
*H04L 12/26* (2006.01)

(52) U.S. Cl.
CPC ........ *H04L 63/1425* (2013.01); *H04L 43/022* (2013.01); *H04L 43/026* (2013.01); *H04L 43/16* (2013.01); *H04L 63/1416* (2013.01)

(58) Field of Classification Search
None
See application file for complete search history.

(56) References Cited

U.S. PATENT DOCUMENTS 6,182,157 B1    1/2001 Schlener et al.
9,749,199 B2 *  8/2017 Brown .................. H04L 43/062
(Continued)

FOREIGN PATENT DOCUMENTS

| JP | 2003-69661 A | 3/2003 |
| WO | 02/057935 A1 | 7/2002 |
| WO | 2009/086843 A1 | 7/2009 |

OTHER PUBLICATIONS

Extended European Search Report dated Dec. 10, 2020 in European Patent Application No. 18780384.6, 8 pages.
(Continued)

Primary Examiner — Jeffery L Williams
(74) Attorney, Agent, or Firm — Xsensus LLP (57) ABSTRACT

An acquiring unit acquires a packet indicating flow information that is output by a network device at a predetermined sampling rate, and a determining unit determines as abnormal, for each of predetermined traffic patterns, when a sampling error rate is equal to or lower than a predetermined upper limit value and the number of packets acquired in a predetermined count period preceding from a current time or an average value of the number of packets per unit time is equal to or higher than a predetermined detection threshold.

5 Claims, 5 Drawing Sheets

(56) References Cited

U.S. PATENT DOCUMENTS

| | | | |
|---|---|---|---|
| 2005/0210533 A1 | 9/2005 | Copeland et al. | |
| 2010/0329146 A1* | 12/2010 | Yoshida | H04L 45/00 370/253 |
| 2013/0103914 A1* | 4/2013 | Mitsunobu | H04L 43/024 711/154 |
| 2015/0052601 A1* | 2/2015 | White | H04L 63/1416 726/13 |
| 2016/0173516 A1* | 6/2016 | Raugas | H04L 63/1408 726/23 |
| 2020/0028866 A1* | 1/2020 | Kurakami | H04L 43/16 |

OTHER PUBLICATIONS

International Search Report and Written Opinion dated Jun. 19, 2018 for PCT/JP2018/012566 filed on Mar. 27, 2018, 9 pages including English Translation of the International Search Report.
Phaal et al., "Packet sampling basics", Oct. 31, 2016, pp. 1-5.
Fastnetmon DDOS detection tool, pp. 1-5.
Tajima et al., "Immediately Useful Techniques for Setting NetFlow/sFlow", Jan. 23, 2009, pp. 16-18.
NFDUMP, pp. 1-8.

* cited by examiner

MONITORING DEVICE, MONITORING METHOD, AND MONITORING PROGRAM

CROSS-REFERENCE TO RELATED APPLICATIONS

The present application is based on PCT filing PCT/JP2018/012566, filed Mar. 27, 2018, which claims priority to JP 2017-074559, filed Apr. 4, 2017, the entire contents of each are incorporated herein by reference.

FIELD

The present invention relates to a monitoring device, a monitoring method, and a monitoring program.

BACKGROUND

In recent years, attacks represented by distributed denial of service (DDoS) attacks against IP networks have been increasing the scale and becoming more sophisticated. Therefore, the importance of traffic monitoring has been increasing.

Conventionally, a technique of traffic analysis, such as management information base (MIB), has been known. Packet capture enables to analyze contents of a packet, but an amount of data is to be large and, therefore, it is not suitable for monitoring traffic of an entire internet service provider (ISP). On the other hand, the MIB is suitable for monitoring traffic of an entire ISP as an amount of traffic through a network device interface, such as a router, can be grasped, but contents of a packet cannot be analyzed.

Techniques called NetFlow, sFlow, internet protocol flow information export (IPFIX), and the like that use flow information output by a network device for analysis of traffic has recently been known. With these techniques, traffic can be analyzed for each detail content of a packet, such as a transception IP address, a protocol, or a port number, by using flow information.

The flow information is collected by, for example, a technique called nfdump (refer to Non Patent Literature 1) or a technique called fastnetmon (refer to Non Patent Literature 2). In nfdump, collected flow information is output every one minute. Moreover, in fastnetmon, it is determined as abnormal traffic when an amount of traffic per unit time that is calculated by dividing a received traffic amount by predetermined detection-required period exceeds a predetermined detection threshold. In Non Patent Literature 3, a sampling error in packet sampling is disclosed.

CITATION LIST

Patent Literature

Non Patent Literature 1: NFDUMP, [online], 2014, [searched on Feb. 27, 2017], Internet <URL: http://nfdump.sourceforge.net/>
Non Patent Literature 2: "FSTNETMON DDOS DETECTION TOOL", [online], [searched on Feb. 27, 2017], Internet <URL: http://fastnetmon.com/>
Non Patent Literature 3: "Packet Sampling Basics", [online] [searched on Mar. 3, 2017], Internet <URL: http://www.sflow.org/packetSamplingBasics/index.htm>

SUMMARY

Technical Problem

However, when conventionally known nfdump is used, there has been a problem that it takes time by minute for analysis of traffic using flow information because input of flow information is every one minute. Moreover, when fastnetmon is used, there has been a problem that although an abnormality can be detected in short time of about several seconds to several tens of seconds, a significant sampling error occurs, and erroneous abnormality detections increase. For example, when a detection threshold is set to 10 kpps, and a sampling rate is set to $1/10000$, if a detection-required time is 1 second, it is determined as abnormal when receiving only 1 packet. Furthermore, in this case, if the detection-required time is 30 seconds, it is determined as abnormal when receiving only 30 packets.

The present invention is achieved in view of the above problems, and it is an object of the present invention to detect a traffic abnormality speedily and accurately by using flow information.

Solution to Problem

To solve the above-described problem and to achieve an object, a monitoring device according to the present invention includes an acquiring unit that acquires a packet indicating flow information that is output by a network device at a predetermined sampling rate, and a determining unit that determines as abnormal, for each of predetermined traffic patterns when a sampling error rate is equal to or lower than a predetermined upper limit value and the number of packets acquired in a predetermined period preceding from a current time or an average value of the number of packets per unit time is equal to or larger than a predetermined detection threshold.

Advantageous Effects of Invention

According to the present invention, it is possible to detect a traffic abnormality speedily and highly accurately by using flow information.

DESCRIPTION OF EMBODIMENTS

Hereinafter, an embodiment of the present invention is described in detail with reference to the drawings. Note that the embodiment is not intended to limit the present invention. Moreover, like reference symbols are given to like parts throughout the drawings.

Overview of Processing of Monitoring Device

Figure 1:
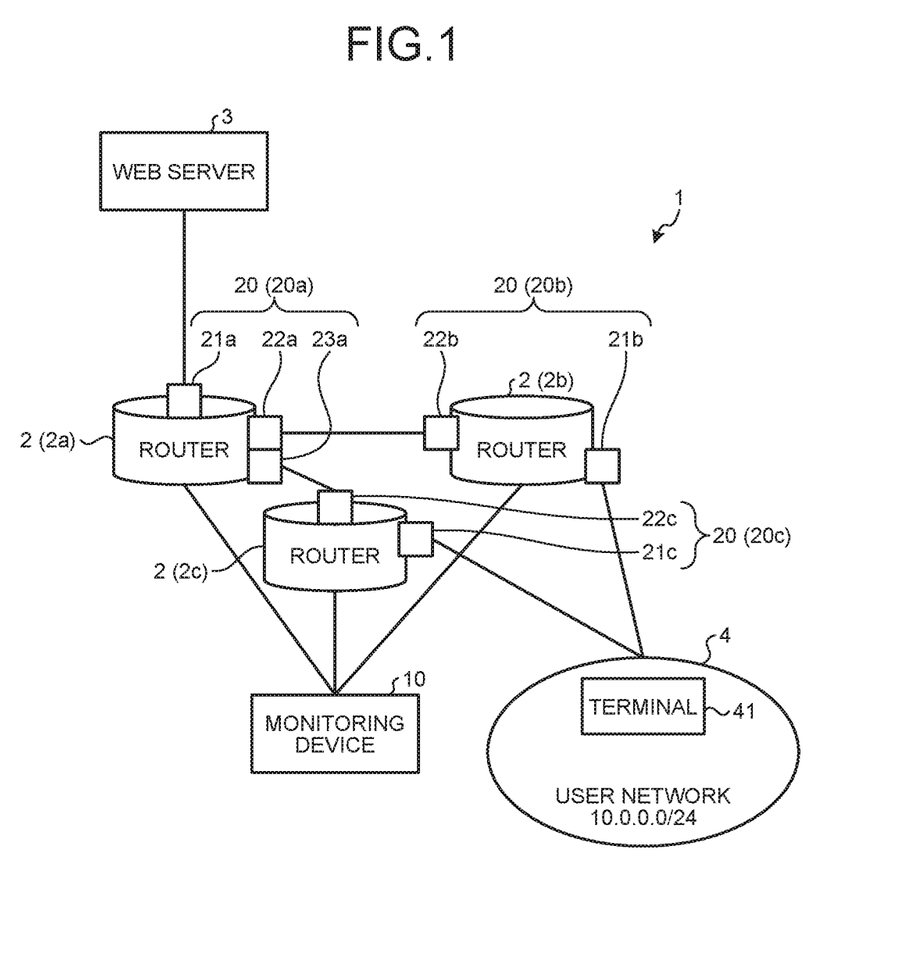
FIG. 1 is an explanatory diagram for explaining an overview of processing performed by a monitoring device according to an embodiment of the present invention.

First, an overview of processing performed by a monitoring device according to a present embodiment is described, referring to FIG. 1. In the present embodiment, the monitoring device is subjected to monitoring processing of traffic in an IP network. As illustrated in FIG. 1, in an IP network 1, a web server 3 and a user network 4 such as d a VLAN are connected to a network constituted of network devices, such as a router 2.

In the IP network 1, traffic occurs when, for example, a terminal 41 in the user network 4 accesses the web server 3 through the router 2, and uses a service provided by the web server 3. Each of the routers 2 generates flow information including information about a transmission source IP address, a destination IP address, a protocol, a transmission-source port number, a destination port number, and the like, from a packet of the traffic received by an interface 20 to other devices.

In an example illustrated in FIG. 1, three units of the routers 2 of a router 2a, a router 2b, and a router 2c are connected so as to be able to communicate with one another through interfaces 20 (20a, 20b, 20c) respectively provided. That is, the router 2a has the interface 20a that includes an interface 21a with respect to the web server 3, an interface 22a with respect to the router 2b, and an interface 23a with respect to the router 2c. Moreover, the router 2b has the interface 21b that includes an interface 21b with respect to the user network 4, and an interface 22b with respect to the router 2a. Furthermore, the router 2c has the interface 20c that includes an interface 21c with respect to the user network 4, and an interface 22c with respect to the router 2a. Moreover, the respective routers 2 are connected to a monitoring device 10 through an interface so as to be able to communicate therewith.

The respective routers 2 performs sampling of flow information of traffic received by the respective interfaces 20 provided therein at a predetermined sampling rate, to transmit to the monitoring device 10. The monitoring device 10 performs monitoring processing described later by using the received flow information, and detects an abnormality of the traffic.

Configuration of Monitoring Device

Figure 2:
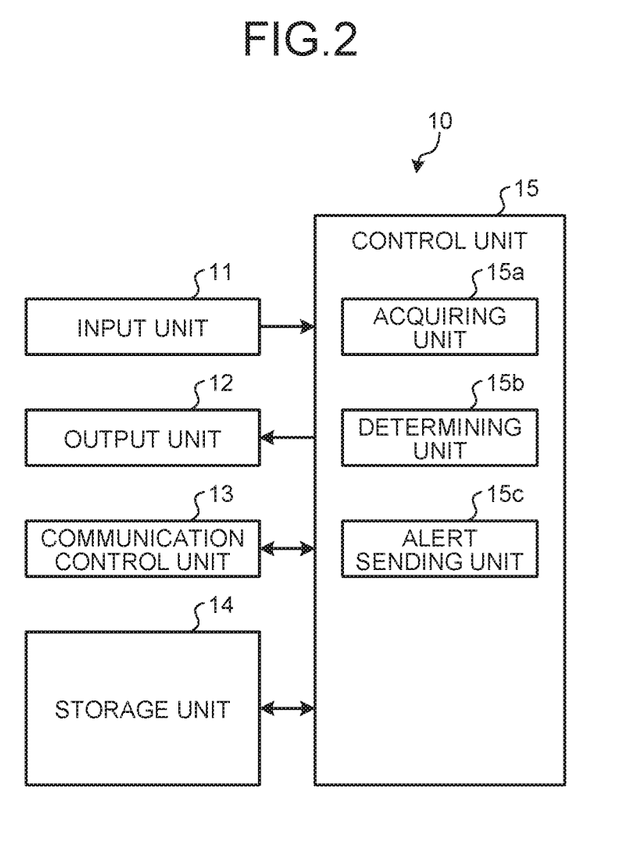
FIG. 2 is a schematic diagram illustrating a schematic configuration of the monitoring device according to the present embodiment.

Next, a schematic configuration of the monitoring device according to the present embodiment is described, referring to FIG. 2. As illustrated in FIG. 2, the monitoring device 10 according to the present embodiment is implemented by a general purpose computer, such as a workstation and a personal computer, and includes an input unit 11, an output unit 12, a communication control unit 13, a storage unit 14, and a control unit 15.

The input unit 11 is implemented by using an input device, such as a keyboard and a mouse, and inputs various kinds of instruction information to the control unit 15, in accordance with an input operation by an operator. The output unit 12 is implemented by a display device, such as a liquid crystal display, a printing device, such as a printer, an information communication device, and the like, and outputs a result of the mongering processing described later, and the like to provide to the operator.

The communication control unit 13 is implemented by a network interface card (NIC) or the like, and controls communication between an external device, such as the router 2 and a server, and the control unit 15 through a telecommunication line, such as a local area network (LAN) and the Internet.

The storage unit 14 is implemented by a semiconductor memory device, such as a random access memory (RAM) and a flash memory, or a storage device, such as a hard disk and an optical disk. In the storage unit 14, a processing program to operate the monitoring device 10, data to be used during execution of the processing program, and the like are stored in advance, or temporarily stored at each time of processing. The storage unit 14 may be configured to communicate with the control unit 15 through the communication control unit 13.

In the monitoring device 10 of the present embodiment, the storage unit 14 stores respective setting values used in monitoring processing described later. For example, in the storage unit 14, traffic patterns of a subject to be monitored, such as known traffic patterns of attacks to detect abnormal traffic from flow information output from the respective routers 2 subjected to the monitoring processing, and a detection threshold Tt for each traffic pattern are stored. Moreover, in the storage unit 14, a sampling rate R, a count period W, an upper limit value $E_0$ of an allowable sampling error rate, and information about an alert destination, and the like of each of the interfaces 20 are stored.

The control unit 15 functions as an acquiring unit 15a, a determining unit 15b, and an alert sending unit 15c as illustrated in FIG. 2, by executing a processing program stored in a memory by an arithmetic processing unit, such as a central processing unit (CPU). Note that these functional units may be mounted on respective or partially different hardware.

The acquiring unit 15a acquires a packet that indicates flow information output by the router 2 at a predetermined sampling rate.

The respective routers 2 generate flow information together with an attribute of a packet received by the respective interfaces 20 by using a technique, such as NetFlow, sFlow, and IPFIX. The flow information includes information about a transmission source IP address, a destination IP address, a protocol, a transmission-source port number, a destination port number, a layer 3 protocol, an interface, and the like.

The respective routers 2 performs sampling on traffic information received by the respective interfaces 20 at a predetermined sampling rate, and outputs to the monitoring device 10 as flow information. It is assumed that flow information about the same traffic is not output among the interfaces 20 of the respective routers 2 to the monitoring device 10 in a duplicated manner. For example, flow information transmitted to the monitoring device 10 with respect to the user network 4 is only the interface 21c of the router 2c and the interface 21b of the router 2b. The acquiring unit 15a acquires flow information output by the respective routers 2.

To the respective routers 2, a different sampling rate per interface 20 may be set. When a sampling rate is not included in the flow information acquired by the monitoring device 10, the monitoring device 10 uses a sampling rate per interface 20 stored in the storage unit 14 in processing described later.

For each predetermined traffic pattern, the determining unit 15b determines it is abnormal when a sampling error rate is equal to or lower than the predetermined upper limit value $E_0$ and the number of packets acquired in the predetermined count period W preceding from a current time or an average value of the number of packets per unit time is equal to or larger than the predetermined detection threshold Tt.

Figure 3:
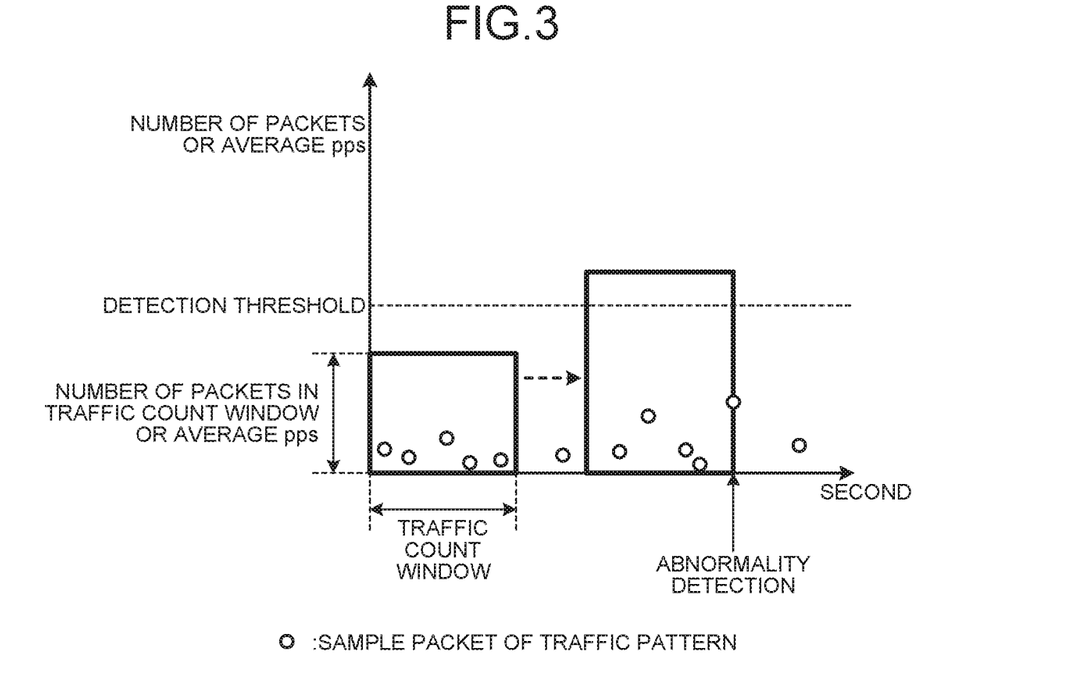
FIG. 3 is an explanatory diagram for explaining processing performed by a determining unit.

Specifically, processing of the determining unit 15b is described, referring to FIG. 3. As illustrated in FIG. 3, the determining unit 15b first counts, per interface 20, the number of corresponding packet Cr of each of the traffic patterns stored in the storage unit 14 from the flow information that is acquired in the predetermined count period (traffic count window) W up to a current time that slides every moment.

It has been known that a relation between the number of sampled samples C [pieces] and a sampling error rate E [%] is expressed by following Equation (1) (refer to Non-Patent Literature 3).

$$E \leq 196 * SQRT(1/C) \tag{1}$$

In this case, the number of samples C is expressed by following Equation (2).

$$C \leq (196/E)^2 \tag{2}$$

Next, the determining unit 15b determines that it is abnormal when the sampling error rate E is equal to or lower than the upper limit value $E_0$ of the allowable sampling error rate and, as illustrated in FIG. 3, the number of packets counted in the count period W up to a current time or an average pps becomes equal to or larger than the predetermined detection threshold Tt. Note that the average pps signifies an average value of the number of packet per unit time. Hereinafter, the average pps is also referred to as the average number of packets. The average number T [pieces/second] of packets [pieces/second] counted in the predetermined count period W [second] is expressed by following Equation (3) by using a sampling rate R.

$$T = C/(W*R) \tag{3}$$

According to above Equation (1), it is found that as the number of packet Cr counted in the count period W by the determining unit 15b increases, the sampling error rate E decreases. Therefore, if following Equation (4) holds, it is regarded that the sampling error rate E is equal to or lower than the upper limit value $E_0$.

$$Cr \geq (196/E_0)^2 \tag{4}$$

Next, the number of packets acquired by the acquiring unit 15a for interface 1 of router 1 is denoted as Cr11, and the number of packets acquired for interface 2 of the router 2 is denoted as Cr21, and the like. In that case, in the flow information of the traffic pattern of the subject to be monitored, if following Equation (5) holds for the number of packets sampled and acquired by the acquiring unit 15a, similarly to above Equation (4), it is regarded that the sampling error rate E is equal to or lower than the upper limit value $E_0$.

$$(Cr11+Cr21+\ldots) \geq (196/E_0)^2 \tag{5}$$

Moreover, when the average number of packets T of the traffic pattern of the subject to be monitored counted in the count period W is equal to or larger than the detection threshold Tt corresponding to each pattern, following Equation (6) holds based on above Equation (3). Note that the traffic pattern of the subject to be monitored and the detection threshold Tt of each traffic pattern are set in advance and stored in the storage unit 14.

$$Tt \leq Cr/(W*R) \tag{6}$$

As described above, the sampling rate R can be set to a different value per interface. A sampling rate of interface 1 of router 1 is denoted as R11, a sampling rate of interface 1 of the router 2 is denoted as R21, and the like. In that case, similarly to above Equation (6), when following Equation (7) derived by adding products of the number of packets of respective interfaces and an inverse of a sampling rate holds, it is regarded that the average number of traffic patterns of the subject to be monitored is equal to or larger than the detection threshold Tt.

$$Tt \leq (Cr11/R11+Cr21/R21+\ldots)/W \tag{7}$$

Therefore, when above Equation (5) and Equation (7) are satisfied at the same time, that is, when following Equation (8) holds, it is regarded that the average number of packets of the traffic pattern of the subject to be monitored acquired in the count period W is equal to or larger than the detection threshold Tt within a range of the allowable sampling error rate.

$$(Cr11+Cr21+\ldots) \geq (196/E_0)^2$$

and $$Tt \leq (Cr11/R11+Cr21/R21+\ldots)/W \tag{8}$$

Accordingly, the determining unit 15b determines that an abnormality has occurred in the traffic when above Equation (8) holds. The determining unit 15b uses a value stored in the storage unit 14 when a value of the sampling rate R of each of the interfaces 20 is not included in the flow information, when calculating with above Equation (8).

Moreover, the determining unit 15b performs abnormality determination by calculation of above Equation (8) each time flow information is acquired, or every short time of about 1 second. Thus, an abnormality can be detected speedily, limiting to a range in which a sampling error is allowed. Furthermore, the determining unit 15b outputs a determination result including information about the number of counted packets, and the like to the alert sending unit 15c.

Figure 4:
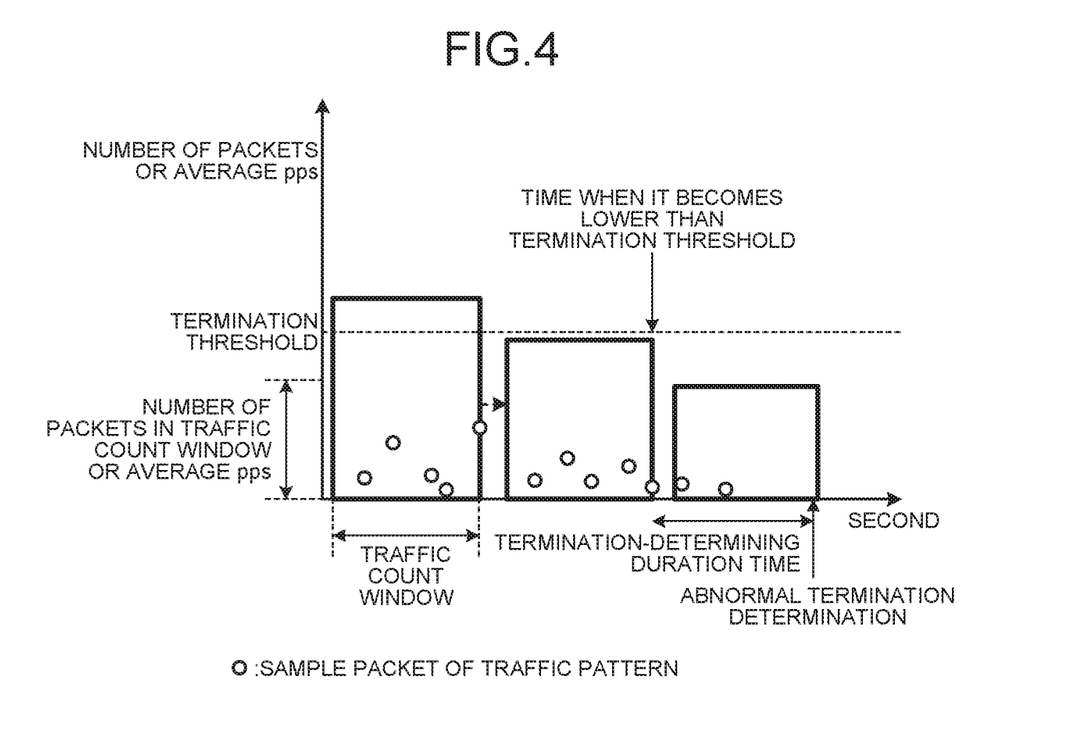
FIG. 4 is an explanatory diagram for explaining processing performed by the determining unit.

Moreover, when abnormal traffic is detected, the determining unit 15b determines termination of the abnormal traffic by using a predetermined termination threshold and termination-determining duration time set in advance and stored in the storage unit 14. Determination processing of abnormal termination by the determining unit 15b is herein described, referring to FIG. 4. After determining as abnormal per predetermined traffic pattern as described above, the determining unit 15b determines as abnormal termination at a point of time when the termination-determining duration time has passed since a time when the number of packets in a count period (traffic count window) or the average number of packets becomes lower than the termination threshold as illustrated in FIG. 4.

Note that the termination threshold and the termination-determining duration time are set in advance for each traffic pattern, similarly to the detection threshold Tt, and is stored in the storage unit 14. The termination threshold may be the same value as the detection threshold, or may be set to a value smaller than the detection threshold to thereby suppress repetition of the abnormality determination. Moreover, the frequency of determination of abnormal termination may be about the same as the abnormality determination, or may be every period of time of about one minute, which is longer than that because it has lower urgency than determination of abnormality.

The alert sending unit 15c functions as a notifying unit, and notifies a determination result by the determining unit 15b to a destination to be notified. Specifically, when the determining unit 15b determines as abnormal, the alert sending unit 15c notifies that an abnormality has been detected to a predetermined alert destination through the communication control unit 13. At this time, the alert sending unit 15c may give information about the counted number of packets and the like that is output by the determining unit 15b along with notification. Furthermore, the alert sending unit 15c may output a message indicating detection of an abnormality, alert, or the like to the output unit 12. Moreover, when the determining unit 15b determines as abnormal termination also, the alert sending unit 15c notifies of the abnormal termination to the predetermined alert destination similarly to the case of determining as abnormal.

Monitoring Processing

Figure 5:
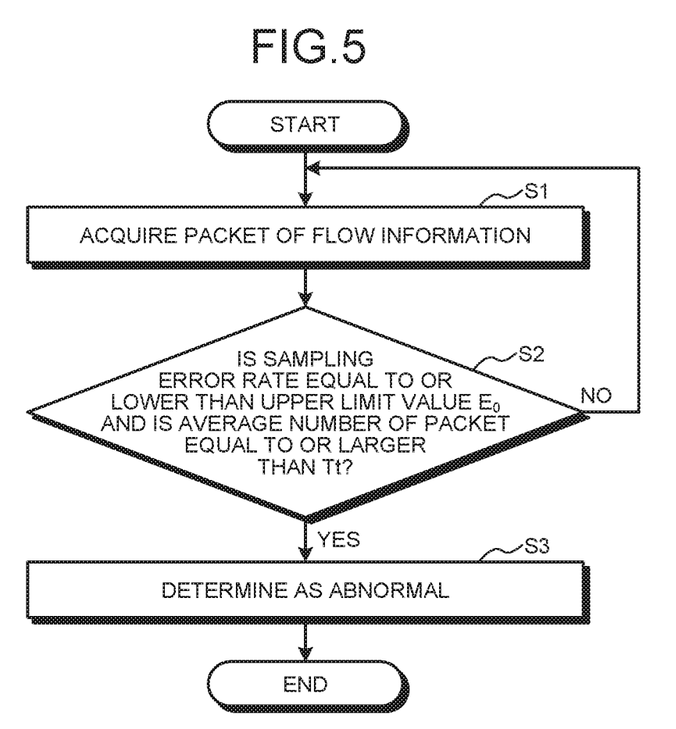
FIG. 5 is a flowchart illustrating procedures of monitoring processing of the present embodiment.

Next, monitoring processing of the monitoring device 10 is described, referring to FIG. 5. FIG. 5 is a flowchart illustrating procedures of the monitoring processing. The flowchart in FIG. 5 starts when an operation input to instruct a start of the monitoring processing is input.

The acquiring unit 15a acquires a packet indicating flow information that is output by the router 2 at a predetermined sampling rate (step S1)

Next, the determining unit 15b checks, for each of the traffic patterns stored in the storage unit 14, whether the sampling error rate is equal to or lower than the upper limit value $E_0$ and the number of packets acquired in the predetermined count period W preceding from a current time or an average value of the number of packets per unit time is equal to or larger than the detection threshold Tt (step S2). That is, the determining unit 15b checks whether above Equation (8) is satisfied.

When above Equation (8) is not satisfied (step S2: NO), the determining unit 15b returns the processing to step S1. On the other hand, when above Equation (8) is satisfied (step S2: YES), the determining unit 15b determines that an abnormality has occurred in traffic (step S3). Moreover, the alert sending unit 15c notifies of detection of an abnormality to a predetermined alert destination. Thus, a series of the monitoring processing is ended.

As described above, in the monitoring device 10 according to the present embodiment, the acquiring unit 15a acquires a packet indicating flow information that is output by the router 2 at a predetermined sampling rate. Moreover, the determining unit 15b determines, for each of traffic patterns stored in the storage unit 14, as abnormal when a sampling error rate is equal to or lower than the upper limit value $E_0$ and the number of packets acquired in the predetermined count period W preceding from a current time or an average value of the number of packets per unit time is equal to or larger than the detection threshold Tt.

Thus, according to the monitoring processing of the monitoring device 10 of the present embodiment, an abnormality can be detected highly accurately and speedily, limiting to a range in which a sampling error rate is allowed.

Moreover, after determining as abnormal, the determining unit 15b determines as abnormal termination when predetermined duration time has passed since a point of time when the number of packets acquired in the count period W or the average number of packets becomes lower than a predetermined termination threshold. Thus, a result of abnormality detection by the monitoring device 10 can be used more effectively.

Furthermore, the alert sending unit 15c notifies the predetermined alert destination about a determination result by the determining unit 15b. Thus, a result of abnormality detection by the monitoring device 10 can be used more effectively.

Program

It is possible to create a program in which the processing performed by the monitoring device 10 according to the present embodiment is described in a computer-executable language. As one embodiment, the monitoring device 10 can implement a monitoring program to perform the monitoring processing described above as package software or online software by installing it on a desirable computer. For example, by causing an information processing apparatus to execute the above monitoring program, it is possible to make the information processing apparatus function as the monitoring device 10. The information processing apparatus herein includes a desktop or a laptop personal computer. Moreover, in addition thereto, as the information processing apparatus, a mobile communication terminal, such as a smartphone, a mobile phone, and a personal handy phone system (PHS), and a slate terminal, such as a personal digital assistants (PDA) are included in the category. Furthermore, regarding a terminal device used by a user as a client, it is possible to be implemented as a server device that provides services relating to the monitoring processing described above to the client. For example, the monitoring device 10 is implemented as a server device that provides a monitoring processing service in which flow information output by the router 2 is received as input data, and a detection result of abnormal traffic is output. In this case, the monitoring device 10 may be implemented as a web server, or may be implemented as a cloud that provides a service relating to the above monitoring processing by outsourcing. In the following, an example of a computer that execute the monitoring program to implement similar functions as the monitoring device 10 is described.

Figure 6:
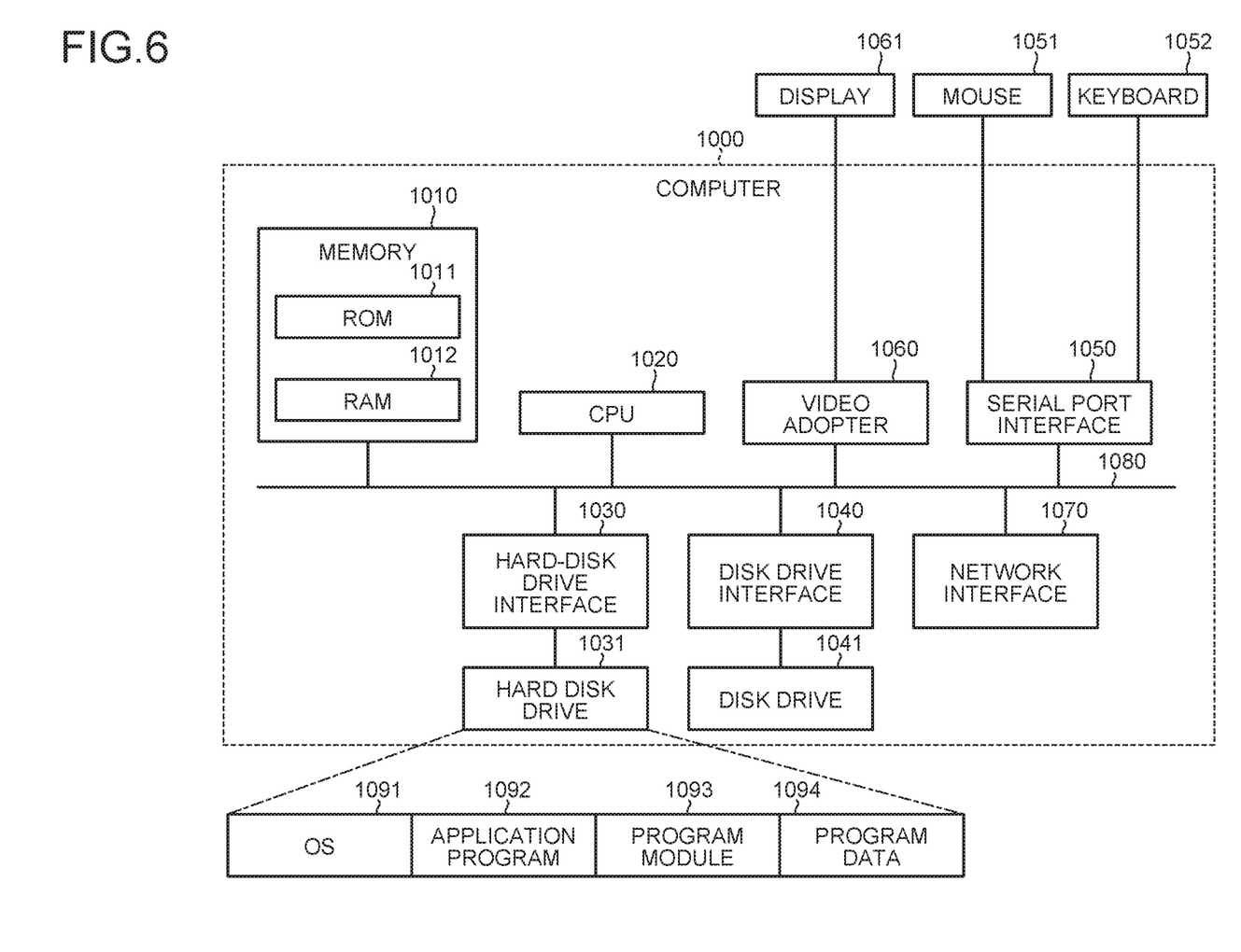
FIG. 6 is a diagram illustrating a computer that executes a monitoring program.

As illustrated in FIG. 6, a computer 1000 that executes the monitoring program includes, for example, a memory 1010, a CPU 1020, a hard-disk drive interface 1030, a disk drive interface 1040, a serial port interface 1050, a video adopter 1060, and a network interface 1070. These respective parts are connected through a bus 1080.

The memory 1010 includes a read only memory (ROM) 1011 and a RAM 1012. The ROM 1011 stores a boot program, such as a basic input output system (BIOS). The hard-disk drive interface 1030 is connected to a hard disk drive 1031. The disk drive interface 1040 is connected to a disk drive 1041. To the disk drive 1041, for example, a detachable storage medium, such as a magnetic disk and an optical disk, is inserted. To the serial port interface 1050, for example, a mouse 1051 and a keyboard 1052 are connected. To the video adopter 1060, for example, a display 1061 is connected.

As illustrated in FIG. 6, the hard disk drive 1031 stores an OS 1091, an application program 1092, a program module 1093, and program data 1094. The respective tables described in the above embodiment are stored, for example, in the hard disk drive 1031 or the memory 1010.

Moreover, the monitoring program is stored in the hard disk drive 1031, for example, as a program module 1093 in which instructions performed by the computer 1000 are described. Specifically, the program module 1093 in which the respective processing performed by the monitoring device 10 described in the above embodiment is described is stored in the hard disk drive 1031.

Furthermore, data used in information processing by the monitoring program is stored, for example, in the hard disk drive 1031 as program data 1094. The CPU 1020 reads out the program module 1093 or the program data 1094 stored in the hard disk drive 1031 as necessary to the RAM 1012, to perform the respective procedures described above.

The program module 1093 and the program data 1094 according to the monitoring program are not limited to be stored in the hard disk drive 1031, but may be stored, for example, in a detachable storage medium and read by the CPU 1020 through the disk drive 1041, or the like. Alternatively, the program module 1093 and the program data 1094 according to the monitoring program may be stored in another computer connected through a network, such as a LAN and a wide area network (WAN), and be read by the CPU 1020 through the network interface 1070.

As above, the embodiments in which the invention achieved by the present inventor is applied has been described, but descriptions and drawings providing a part of disclosure of the present invention by the present embodiment are not intended to limit the present invention. That is, other embodiments, implementation examples, operating techniques, and the like made by those skilled in the art and the like based on the present embodiment are all included in the scope of the present invention.

REFERENCE SIGNS LIST

1 IP NETWORK
2 ROUTER
20 INTERFACE
3 WEB SERVER
4 USER NETWORK
41 TERMINAL
10 MONITORING DEVICE
11 INPUT UNIT
12 OUTPUT UNIT
13 COMMUNICATION CONTROL UNIT
14 STORAGE UNIT
15 CONTROL UNIT
15a ACQUIRING UNIT
15b DETERMINING UNIT
15c ALERT SENDING UNIT

The invention claimed is:

1. A monitoring device comprising:
a memory; and
a processor coupled to the memory and programmed to execute a process comprising:
acquiring a packet indicating flow information that is output by a network device at a predetermined sampling rate; and
determining as abnormal, for each of predetermined traffic patterns when a sampling error rate is equal to or lower than a predetermined upper limit value and a number of packets acquired in a predetermined period preceding from a current time or an average value of the number of packets per unit time is equal to or larger than a predetermined detection threshold.

2. The monitoring device according to claim 1, wherein after determining as abnormal, determining as abnormal termination, for each of the predetermined traffic patterns, when predetermined duration time has passed since a point of time when the number of packets acquired in the period or the average value of the number of packets per unit time becomes lower than a predetermined termination threshold.

3. The monitoring device according to claim 1, further comprising
notifying a predetermined destination about a determination result by the determining.

4. A monitoring method that is performed by a monitoring device, comprising:
acquiring a packet indicating flow information that is output by a network device at a predetermined sampling rate; and
determining as abnormal, for each of predetermined traffic patterns when a sampling error rate is equal to or lower than a predetermined upper limit value and a number of packets acquired in a predetermined period preceding from a current time or an average value of the number of packets per unit time is equal to or larger than a predetermined detection threshold.

5. A non-transitory computer-readable recording medium storing a monitoring program that causes a computer to execute:
acquiring a packet indicating flow information that is output by a network device at a predetermined sampling rate; and
determining as abnormal, for each of predetermined traffic patterns when a sampling error rate is equal to or lower than a predetermined upper limit value and a number of packets acquired in a predetermined period preceding from a current time or an average value of the number of packets per unit time is equal to or larger than a predetermined detection threshold.

* * * * *